(12) United States Patent
Furusawa et al.

(10) Patent No.: US 8,458,801 B2
(45) Date of Patent: Jun. 4, 2013

(54) HIGH-ASSURANCE SECURE BOOT CONTENT PROTECTION

(75) Inventors: Michael Masaji Furusawa, Chino Hills, CA (US); Chieu The Nguyen, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 102 days.

(21) Appl. No.: 12/970,163

(22) Filed: Dec. 16, 2010

(65) Prior Publication Data

US 2012/0005484 A1    Jan. 5, 2012

Related U.S. Application Data

(62) Division of application No. 11/191,552, filed on Jul. 28, 2005, now abandoned.

(60) Provisional application No. 60/593,016, filed on Jul. 30, 2004, provisional application No. 60/593,016, filed on Jul. 30, 2004.

(51) Int. Cl.
    *G06F 21/00* (2006.01)
(52) U.S. Cl.
    USPC ...... 726/26; 726/2; 726/4; 713/164; 713/193; 380/262; 709/224; 455/41.1
(58) Field of Classification Search
    USPC ............................................. 713/189; 726/26
    See application file for complete search history.

(56) References Cited

U.S. PATENT DOCUMENTS

| 4,679,166 | A | | 7/1987 | Berger et al. ...................... 713/2 |
|---|---|---|---|---|
| 6,151,678 | A | * | 11/2000 | Davis .............................. 726/35 |
| 6,378,072 | B1 | | 4/2002 | Collins et al. ................. 713/187 |
| 6,400,717 | B1 | | 6/2002 | Von Ahnen et al. .......... 370/395 |
| 6,738,975 | B1 | * | 5/2004 | Yee et al. ....................... 719/310 |
| 7,007,300 | B1 | | 2/2006 | Weber et al. ..................... 726/21 |
| 7,278,031 | B1 | * | 10/2007 | Best .............................. 713/193 |
| 7,315,903 | B1 | * | 1/2008 | Bowden ........................ 709/250 |
| 2002/0073316 | A1 | * | 6/2002 | Collins et al. ................. 713/174 |
| 2002/0147920 | A1 | * | 10/2002 | Mauro ........................... 713/200 |
| 2003/0041250 | A1 | | 2/2003 | Proudler ....................... 713/182 |
| 2004/0003321 | A1 | | 1/2004 | Glew et al. ..................... 714/27 |
| 2004/0064746 | A1 | * | 4/2004 | Nishimoto et al. ............ 713/323 |
| 2004/0073806 | A1 | | 4/2004 | Zimmer ........................ 713/189 |
| 2004/0088559 | A1 | | 5/2004 | Foster et al. .................. 713/193 |
| 2004/0158742 | A1 | * | 8/2004 | Srinivasan et al. ............ 713/201 |

(Continued)

OTHER PUBLICATIONS

Arbauch et al., A secured and Reliable Bootstrap Architecture, May 4-7, 1997, Security and Privacy, 1997. Proceedings, 1997 IEEE Symposium, Oakland, CA USA INSPEC Accession No. 560912.

(Continued)

*Primary Examiner* — Morshed Mehedi
(74) *Attorney, Agent, or Firm* — Drinker Biddle & Reath LLP

(57) ABSTRACT

A method and apparatus for high assurance boot processing is disclosed. A trusted processor is used to authenticate a trusted boot program and in conjunction with a selector, to provide the authenticated boot program to a boot memory where it can be accessed by a main processor to execute the bootup sequence. The trusted processor also provides a command for the main processor to write a data sequence to a hard drive or similar device, and monitors the data written by the main processor to verify that the data has not been tampered with or otherwise compromised.

11 Claims, 14 Drawing Sheets

U.S. PATENT DOCUMENTS

| | | | |
|---|---|---|---|
| 2005/0015611 A1* | 1/2005 | Poisner | 713/200 |
| 2005/0081048 A1* | 4/2005 | Komarla et al. | 713/193 |
| 2005/0086509 A1 | 4/2005 | Ranganathan | 713/200 |
| 2005/0138409 A1* | 6/2005 | Sheriff et al. | 713/200 |
| 2005/0193189 A1 | 9/2005 | Kim | 713/1 |
| 2005/0228980 A1 | 10/2005 | Brokish et al. | 713/2 |
| 2005/0262360 A1 | 11/2005 | Khan et al. | 713/189 |
| 2006/0112213 A1* | 5/2006 | Suzuoki et al. | 711/100 |
| 2006/0179302 A1* | 8/2006 | Hatakeyama | 713/164 |

OTHER PUBLICATIONS

Peter Gutmann, "Data Remanence in Semiconductor Devices", IBM T.J. Watson Research Center.

Arbauch et al., A secured and Reliable Bootstrap Architecture, May 4-7, 1997, Security and Privacy, 1997. Proceedings, 1997 IEEE Symposium, Oakland, CA USA INSPEC Accession No. 5602912.

Jacob A. van der Pol et al., "Relation between the hot carrier lifetime of transistors and CMOS SRAM products", CH2787-0/90/0000-0178 ©, 1990 IEEE/IRPS.

Yoonjong Huh et al., "Hot-Carrier-induced Circuit Degradation in Actual DRAM", 0-7803-2031-X/95 ©, 1995 IEEE.

Jian Tao et al., "Metal Electromigration Damage Healing Under Bidirectional Current Stress", IEEE Electron Device Letters, vol. 14, vol. 12, Dec. 1993.

Jian Tao et al., "An Electromigration Failure Model for Interconnects Under Pulsed and Bidirectional Current Stressing", IEEE Transactions on Electron Devices, col. 41, No. 4, Apr. 1994.

T. Endoh et al., New Write/Erase Operation Technology for Flash EEPROM Cells to Improve the Read Disturb Characteristics, ULSI Research Center Toshiba Corporation, 0-7803-0817-4/92 © 1992 IEEE, IEDM 92-603.

Peter Gutmann, "Secure Deletion of Data from Magnetic and Solid-State Memory", Sixth USENIX Security Symposium Proceedings, San Jose, CA, Jul. 22-25, 1996.

William Mchuron, Director, Information Technology Laboratory, "Security Requirements for Cryptographic Modules", Federal Information Processing Standards Publication, FIPS Pub 140-2, Issued May 25, 2001.

* cited by examiner

HIGH-ASSURANCE SECURE BOOT CONTENT PROTECTION

CROSS-REFERENCE TO RELATED APPLICATIONS

This application is a divisional of U.S. patent application Ser. No. 11/191,552, filed Jul. 28, 2005, now abandoned which application is incorporated herein in its entirety. This application claims benefit of U.S. Provisional Patent Application No. 60/593,015, entitled "HIGH-ASSURANCE PROCESSOR ACTIVE MEMORY CONTENT PROTECTION," by Michael Masaji Furusawa and Chieu T. Nguyen, filed Jul. 30, 2004, and U.S. Provisional Patent Application No. 60/593,016, entitled "HIGH-ASSURANCE SECURE BOOT CONTENT PROTECTION," by Michael Masaji Furusawa, and Chieu T. Nguyen, filed Jul. 30, 2004 which applications are hereby incorporated by reference herein.

This application is related to the following co-pending and commonly assigned patent application, which application is also incorporated by reference herein:

Application Ser. No. 11/191,755, entitled "HIGH-ASSURANCE PROCESSOR ACTIVE MEMORY CONTENT PROTECTION," filed Jul. 18, 2005, by Michael Masaji Furusawa and Chieu T. Nguyen.

BACKGROUND OF THE INVENTION

1. Field of the Invention

The present invention relates to systems and methods of secure processing, and in particular to a method and system for securely booting a computer.

2. Description of the Related Art

Conventional computer systems run under the control of an operating system that is stored on a hard disk drive. When the computer system is started up, the computer system's processor must receive instructions enabling it to access the operating system on the hard disk drive, load it into the operating memory of the computer, and execute the operating system so that the computer may become operable. Such startup instructions are typically stored in read only memory (ROM) or boot flash memory internal to the computer system, and are conventionally known as the basic input/output system, or BIOS.

Unfortunately, during boot-up, the computer system is vulnerable to hacking. This can be accomplished, for example, by modifying or bypassing the boot-up instructions, and inserting other instructions that can be exploited to hack into the computer system and it's related security features, including cryptographic security elements.

What is needed is a system and method for preventing such attacks, and rendering the computer system more secure during and after the boot-up process. The present invention satisfies that need.

SUMMARY OF THE INVENTION

To address the requirements described above, the present invention discloses a method and apparatus for high assurance boot processing. In one embodiment, the method comprises the steps of transmitting a request from a trusted processor to the main processor to write a data pattern to the storage device, providing an encrypted data pattern to the storage device for storage in the storage device, providing the encrypted data pattern provided to the storage device to the trusted processor, and verifying the data encryption operations in the trusted processor from a comparison between the data pattern and the encrypted data pattern provided to the trusted processor. In another embodiment, the invention is embodied in a data monitor, communicatively coupled to monitor data written to the storage device and a trusted processor, communicatively coupled to the main processor and the data monitor, the trusted processor for generating a command for the main processor to write a data pattern to the storage device, and for verifying the encryption of data provided between the main processor and the storage device using a comparison between the data pattern and an encrypted version of the data pattern read from the monitor register. In a second embodiment, the method comprises the steps of receiving a trusted boot program in a hardware trusted processor distinct from the main processor, authenticating the trusted boot program in the trusted processor, and providing the trusted boot program to the main processor. This may be embodied in a trusted processor, for reading and authenticating a trusted boot program and a selector, selectably coupling the trusted processor or the main processor to a boot memory according to a selector signal from the trusted processor.

The disclosed system includes a selector element coupled to the boot flash memory. This switch element operates under the control of a trusted hardware processor that is separate from the main processor. The selector element allows the trusted processor to authenticate the boot program before allowing the main processor to execute it to boot up the computer. It also permits the boot program to be securely stored.

The disclosed system also incorporates a "heartbeat monitor" function, which allows the trusted processor to monitor and verify the encryption of files and data being stored on the hard drive or other storage device. This "hardens" the encryption process, and eliminates the need for the main processor to include a secure hardware processor to perform the required file encryption/decryption. This increases security without the extra expense and eventual obsolescence inherent in hardware processor solutions.

Adequate security can be achieved without the problems associated with a trusted main processor because the trusted processor can control the secure boot contents and authenticate the boot program before providing it to the main processor for execution. It also permits monitoring the authenticity of data stored in the data storage devices. Relieved of trusted processor requirements, the main processor can be less expensive, faster, and can be easily upgraded when necessary. Further, the trusted processor can be designed so that it is adaptable to a wide variety of main processor technology roadmaps.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
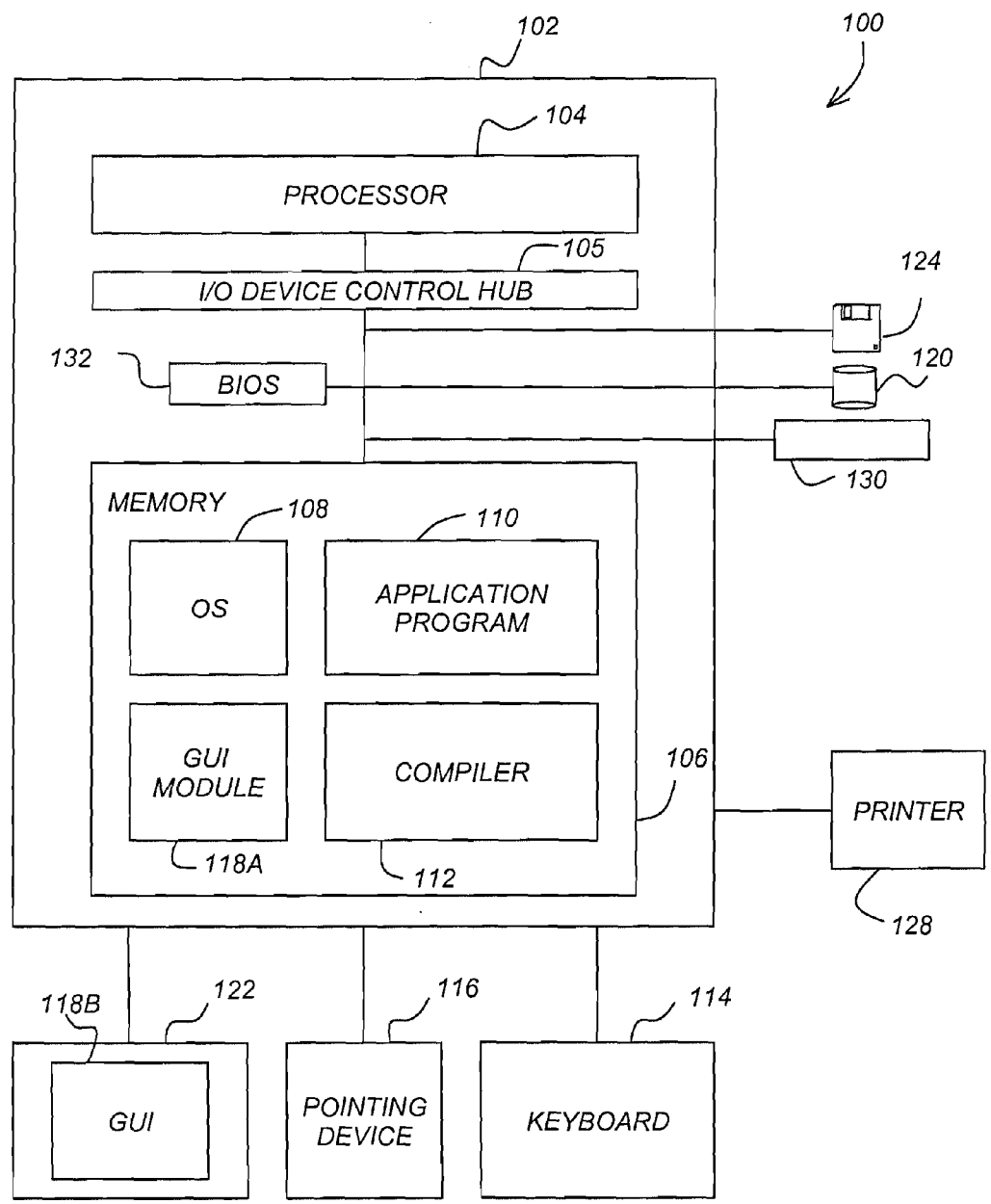
FIG. 1 is a block diagram of a conventional computer system.

A conventional computer system 100 is illustrated in FIG. 1. The computer 102 comprises a processor 104 coupled to one or more memory devices via an I/O device control hub 105 or similar device. Such memory devices can include random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

Instructions implementing the operating system 108, the computer program 110, and the compiler 112 may be tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices.

Most computer systems 100 today include built-in processor instructions that are stored in a memory 132 (e.g. read only memory (ROM) or flash memory) that are automatically executed on startup. These instructions, sometimes known as "BIOS" (e.g. basic input/output system) tests the system and prepares the computer for operation by querying its own small CMOS memory bank for drive and other configuration settings. It searches for other BIOS's on the plug-in boards and sets up pointers (interrupt vectors) in memory to access those routines. It then loads the operating system 108 and passes control to it.

Unfortunately, the computer system 100 can be vulnerable to hacking via the BIOS. Hence, high assurance cryptographic security designs typically include the notion of a secure boot process, whereby the BIOS is protected, for example, by the use of digital signatures, partial encryption, and/or partial encryption in conjunction with a hardware token. The common idea among such methods is to authenticate the boot program being stored on the computer system prior to execution, a process known as authenticated boot processing.

Fundamentally, such schemes still execute the authentication process using the main processor 104 (un-evaluated and therefore un-trusted) 104 on a general-purpose computer, and thus lack an absolute root of trust element that can essentially "certify" all hardware and software elements for the boot sequence.

Figure 2:
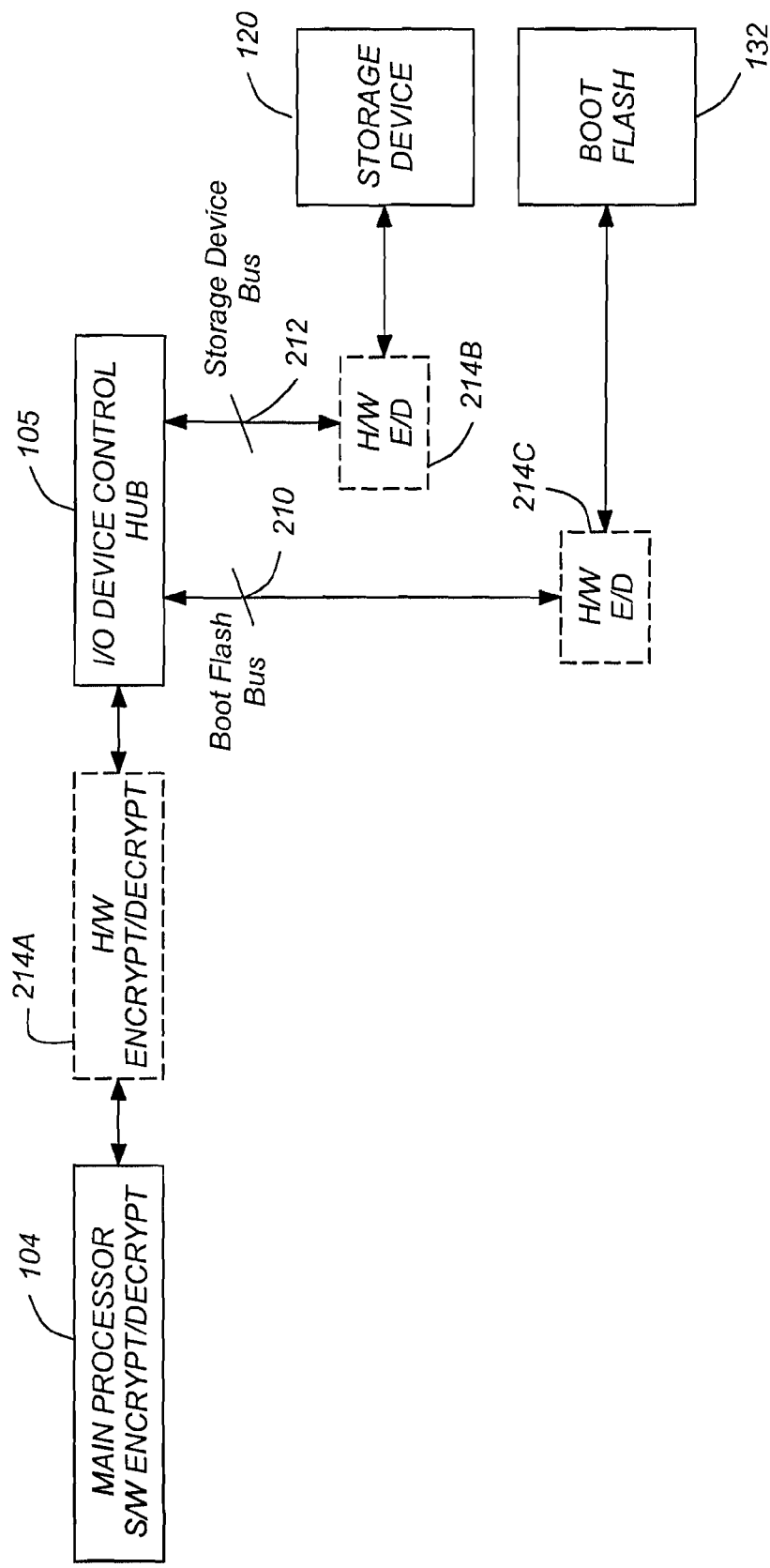
FIG. 2 is a block diagram of a conventional computer I/O architecture.

FIG. 2 is a simplified diagram of a conventional computer I/O architecture. We refer to "secure boot content" as data in both boot memory 120 and storage device 132 (such as a hard drive) that is read via the I/O device control hub 105 and used by the main processor 104 to execute the boot sequence, including the loading of the operating system 108 and application data 110 into the memory 106. Note that the I/O device control hub 105 interfaces with the boot flash 132 via boot flash bus 210 and with the storage device 120 via the storage device bus 212.

High-assurance secure boot content data processing methods can include hardware or software encryption of the active secure boot data. This encryption/decryption can use hardware or software tokens, if desired. This encryption function includes both file encryption (manually or automatically enabled) and an encrypted file system. For example, the confidentiality of the information stored in the storage device 132 and/or the boot flash 132 can be provided by a hardware encryptor/decryptor 214A coupled between the main processor 104 and the I/O device control hub 105 and/or hardware encryptor/decryptors 214B and 214C coupled between the I/O device control hub 105 and the storage device 120 and the boot flash 132, respectively. Alternatively, a software encryption/decryption may be used and implemented in the main processor 104 and/or the I/O device control hub 105.

Both hardware and software encryption techniques have distinct disadvantages. Hardware encryptors/decryptors can increase cost, decrease processing speeds, and are rendered obsolete by ever-increasing processing speeds and the ever-changing interfaces of modern day computing platforms. Main processor 104 interfaces also involve technologies that are subject to rapid communication protocol/format changes and processing speed improvements, including interfaces with the storage elements 120, 132 and processor busses (including control, address and data busses).

Software encryption can be less expensive and offers independence from hardware technology changes, but are more easily compromised than hardware encryption devices. To provide the level of assurance required in some applications, a trusted hardware processor environment is required in order to ensure proper execution.

At the same time, conventional data processing tasks (e.g. boot, operating systems, applications) requires processing speeds, standardized architectures, and chip sets that exceed trusted processor performance. Trusted processor designs are also typically custom designed, and outdated by changes in operating systems, applications, and hardware design.

Also, though effective, the encryption of active secure boot data is not a complete deterrent, since similar protection must be provided for the vital secret parameters, such as crypto variables and credentials. Should the protection of the critical secrets be defeated and these parameters recovered, the encrypted data can be easily decrypted and compromised. Even with the encryption and decryption described above, this architecture is vulnerable to unauthorized data corruption and alteration, exposing the boot process (and hence the entire computer) to compromise.

Figure 3:
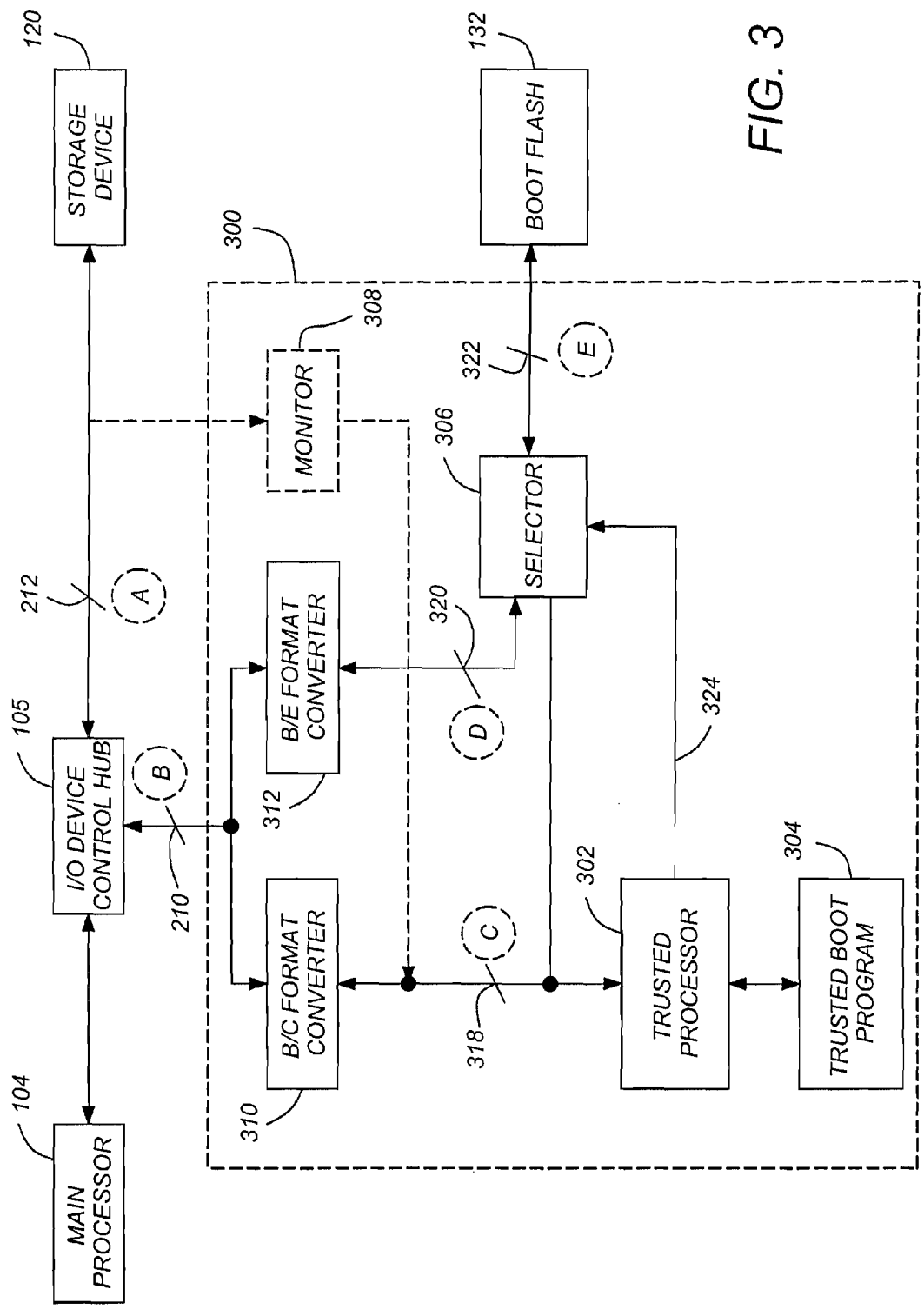
FIG. 3 is a block diagram of a computer I/O architecture augmented with a high assurance boot content protection system.

FIG. 3 is a diagram of the conventional computer architecture 200 shown in FIG. 2 augmented with a high-assurance boot content protection system 300.

Trusted Processor

The system 300 includes a trusted processor 302 communicatively coupled to a memory 304 storing a trusted boot program, to a selector 306, and to the main processor 104 (e.g. via the optional format converter 310, boot flash bus 210, and the I/O device control hub 105 as discussed further below). The selector 306 selectably couples boot flash 132 to either the trusted processor 302 or the main processor 104 (via I/O device control hub 105) according to a switch signal 324 from the trusted processor 302.

The trusted processor performs two important functions: (1) protecting the integrity of the boot program used to boot the computer system 102 by verifying the authenticity of the boot program, and (2) assuring the confidentiality of data stored in the storage device 120.

To protect the integrity of the boot program used to boot the computer system 102, the trusted processor 302 reads and authenticates a locally stored trusted boot program. This is accomplished by internally verifying the contents read from the memory 304 using cryptography and authentication methods. In one embodiment, the memory 304 is a trusted memory and is accessible by only the trusted processor 302. After the boot program is decrypted (if stored in the memory 304 in encrypted form) verified, the trusted processor 302 provides a switch signal to the selector 306 to communicatively couple the trusted processor 302 and the boot flash 132, and loads the authenticated boot program into the boot flash 132. The trusted processor 302 then provides a second switch signal to the selector 306 to decouple the trusted processor 302 from the boot flash 132 and couple the boot flash 132 to the main processor 104, thus allowing the main processor 104 to access the authenticated boot program.

To assure the confidentiality of the data stored in the storage device (including the operating system 108 and applications 110), the trusted processor 302 monitors and verifies the integrity of the encrypted data stored in the storage device 132. This verification can be performed on a periodic or aperiodic basis, upon command, or on a random basis. This is accomplished by commanding the main processor 104 to write a data pattern to the storage device 120, monitoring the data provided to the storage device 120 for storage, and comparing the monitored values with expected values.

The trusted processor 302 may include one or more of the following features: (1) separate plain and cipher test host busses with bypass data function capability, (2) a user mode for general purpose functions and a crypto mode for supervisory functions, (3) a software interrupt (SWI) command set that places the trusted processor 300 in the crypto mode and permits crypto map functions, (4) a mask ROM implementing high assurance trust anchors, cryptographic controls, functions, and algorithms, (5) program and data cache memory for on-chip execution of classified (or unclassified) functions, algorithms, and protocols, (6) a built-in hardware multiplier for accelerating public key exchange algorithms, (7) tamper zeroizable battery backed RAM (BRAM) for storage of secret data, parameters, keys, and type 1 configuration data, (8) redundant cryptographic crypto engines, (9) two serial communications ports for type 1 key fill and authenticated software download operations, (10) crypto engine (CE) interface for programming and control of external field programmable gate arrays FPGA(s), (11) non-deterministic hardware random number generator (randomizer), and (12) a high assurance redundant alarm system.

Bus Conversion

Ordinarily, the boot flash memory bus 322 selector bus 320 and trusted processor bus 318 are inter-compatible in format and protocol. However, the boot flash bus 210 of the I/O device control hub 105 and the storage device bus 212 are typically not compatible in either format or protocol with busses 318, 320 and 322. Accordingly, the high-assurance boot content protection system 300 optionally includes a first format converter 310 coupled between the trusted processor bus 318 and the boot flash bus 210 of the I/O device control hub 105 and a second format converter 312 coupled between the boot flash memory bus 322 and the I/O device control hub 105. The first format converter 310 converts between the format and protocol of the signals from the trusted processor device 302 and its associated bus 318 and the format and protocol of the I/O device control hub 105 and its associated boot flash bus 210. This permits the trusted processor 302 to appear as a "device" to the main processor 104. The second format converter 312 converts between the format and protocol of the signals from the boot flash bus 210 and the boot flash itself 132, thus allowing the boot flash 132 to appear as a device to the main processor 104 and allowing the passage of information therebetween.

Monitor Function

In one embodiment, the high-assurance boot content protection system 300 also includes a monitor 308. The monitor is a means by which the trusted processor 302 can determine what data was written to the storage device 120 by the main processor 104 through the I/O device hub 105. This allows the trusted processor 302 to verify that the data is not tampered with and is encrypted properly before storage in the storage device 120. While FIG. 3 functionally illustrates the monitor 308 as an entity disposed between the interface between the I/O device control hub 105 and the storage device 120 and the trusted processor 302, the monitor 308 can be implemented in a number of ways, as is further discussed below.

For example, the monitor 308 may comprise memory register (implemented, for example, in solid state memory) separate from the main processor 104, the I/O device control hub 105, and the storage device 120. The monitor 308 can also be resident in the storage device 120 (e.g. if the storage device 120 is a hard disk drive, the monitor 308 could be a solid-state RAM or ROM memory, a configuration register of the hard drive, or can comprise a hidden sector of the hard drive media. The monitor 308 can also be resident in the I/O device control hub 105, either as RAM or ROM, or in a configuration register. The monitor 308 may also be implemented a memory associated with the main processor 104, including a RAM or ROM memory, or in a configuration register.

The monitor 308 can be coupled to provide data to the trusted processor 302 as shown in FIG. 3, that is using a data path between the I/O storage device control hub 105 and the storage device 120 and the trusted processor 302 via the trusted processor bus 318. Alternatively, data can be passed from the monitor 308 to the trusted processor via the I/O device control hub 105, and optional format converter 310, via the storage device bus 212, boot flash bus 210 and trusted processor bus 318. This data path may also optionally include the main processor 104 as well, as described further below.

Operations

Figure 4A:
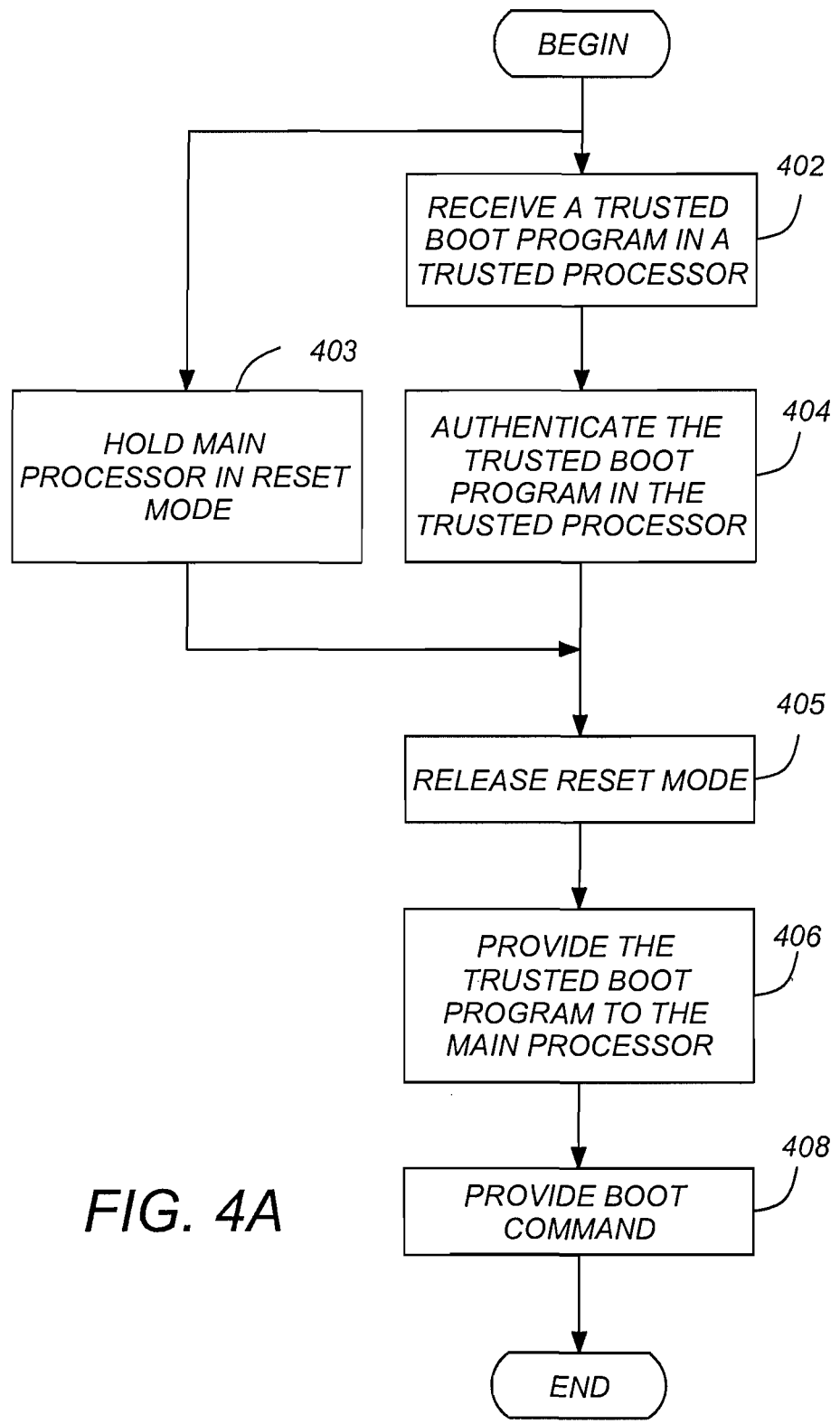
FIGS. 4A-4B are flow charts illustrating exemplary method steps that can be used to assure that the proper boot program is provided to the main processor for execution.
Figure 4B:
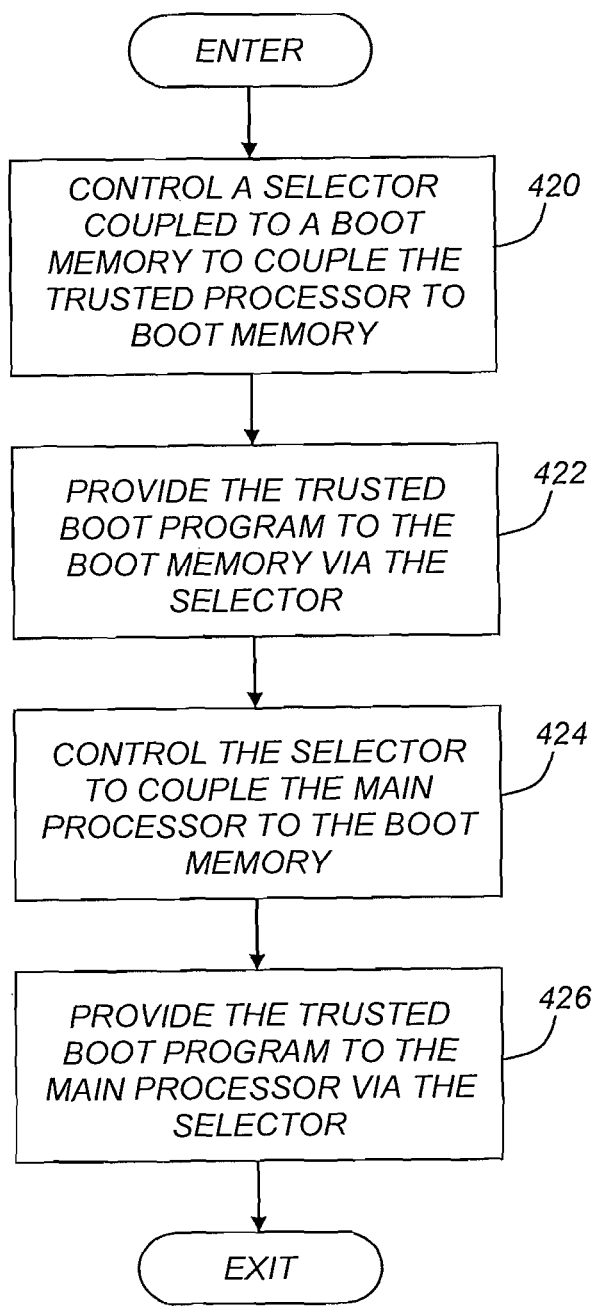
Figure 5A:
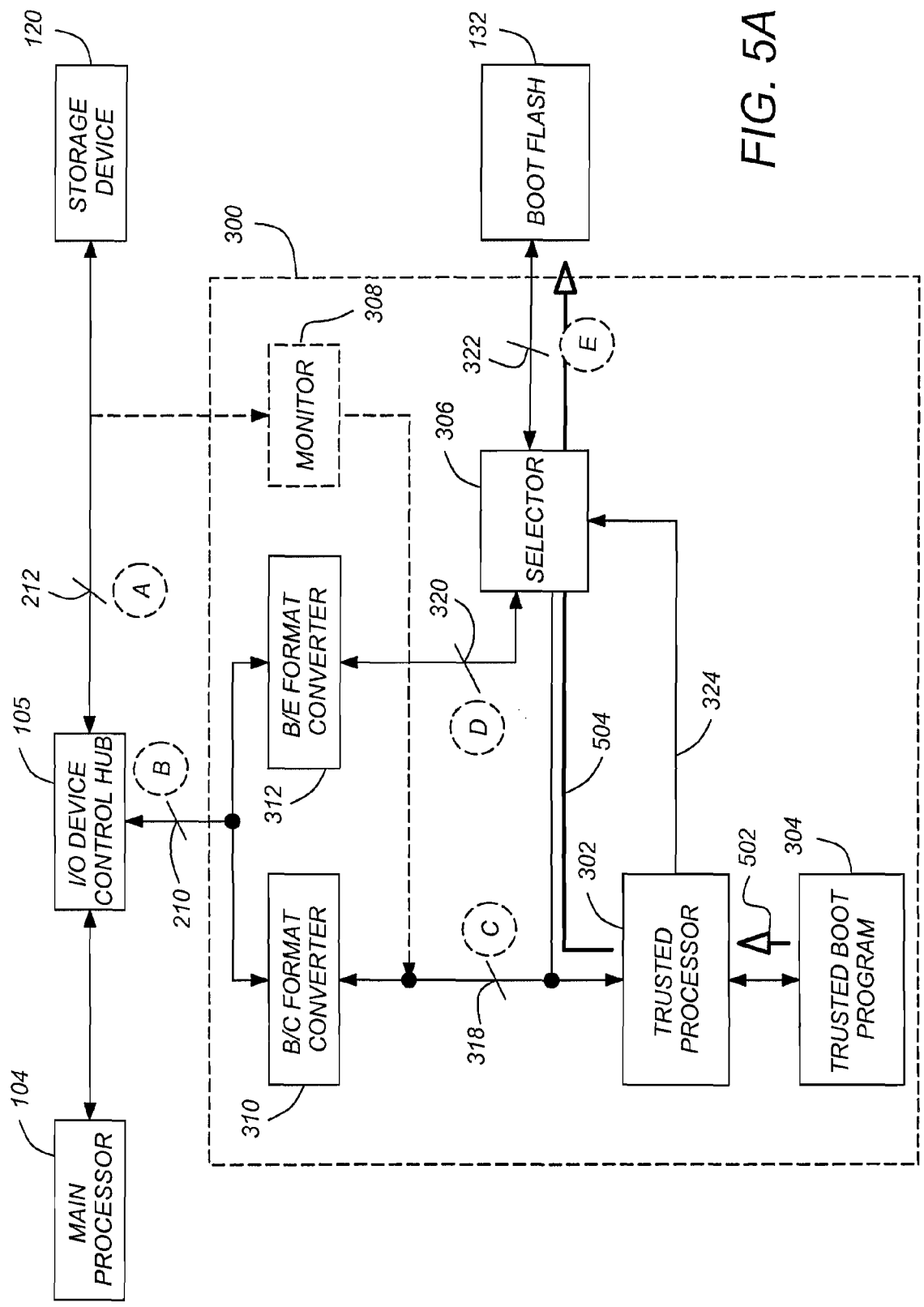
FIGS. 5A-5B are diagrams illustrating the operations of FIGS. 4A-4B as applied to the system shown in FIG. 3.
Figure 5B:
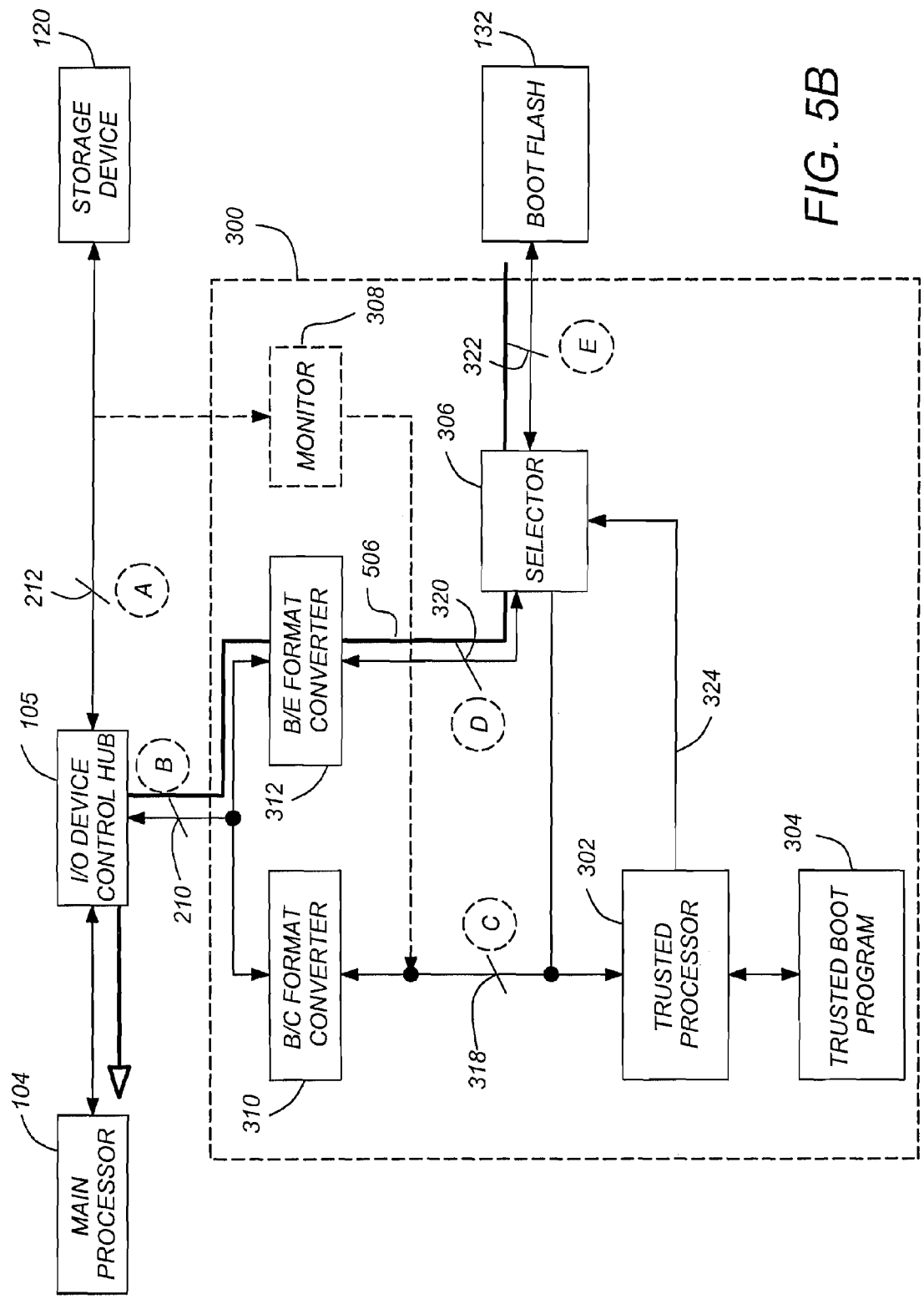

FIGS. 4A-4B are a flow charts illustrating exemplary steps that can be used to assure that the proper boot program is provided to the main processor 104 for execution. FIGS. 4A-4B will be described in conjunction with FIGS. 5A-5C, which further illustrate the operations described in FIG. 4 as they may be performed by the high-assurance boot content protection system 300 shown in FIG. 3.

In block 402, a trusted boot program is received in a trusted boot processor 302. In the illustrated embodiment of the boot content protection system 300 shown in FIG. 5A, the trusted boot program is provided by a memory 304 local to the trusted processor, and the transfer of the trusted boot program data is indicated by arrow 502.

To further secure the trusted boot program, it may be stored in the memory 304 in encrypted form. In this case, the trusted processor 302, using the cryptographic controls and securely stored keys described above, decrypts the encrypted trusted boot program before authentication.

In either case, the trusted boot program is authenticated by the trusted processor 302. While the trusted boot program is being received, optionally decrypted and authenticated, the trusted processor 302 provides a command to hold the main processor 104 in a reset mode, as shown in block 403. After the trusted boot program is authenticated the reset mode is released, as shown in block 405

The trusted boot program is then provided to the main processor 104 (e.g. the main processor reads it from the boot memory 132), and a boot command is provided by the trusted processor 302 so that the boot program can be executed, as shown in blocks 406 and 408.

FIG. 4B is a flow chart illustrating exemplary steps that can be used to provide the trusted boot program to the main processor 104. In block 420, a selector 306 is controlled to couple the boot memory 132 with the trusted processor 302. In the illustrated embodiment, this is accomplished by generating a selector signal in the trusted processor 302 and providing the selector signal to the selector via signal line 324. The trusted (and now, authenticated) boot program is then provided to the boot memory 132 via the selector 306 for storage, and stored in the boot memory 132, as shown in block 422 and by path 504 of FIG. 5A.

The trusted processor 302 then controls the selector 306 to couple the boot memory 132 to the main processor 104, as shown in block 424. The authenticated trusted boot program is then provided to the main processor 104 via the selector 306. The main processor 104, in response to a boot command from the trusted processor 302, executes the boot program. This is illustrated in block 426 of FIG. 4B and paths 506 and 508 of FIG. 5B.

Figure 6:
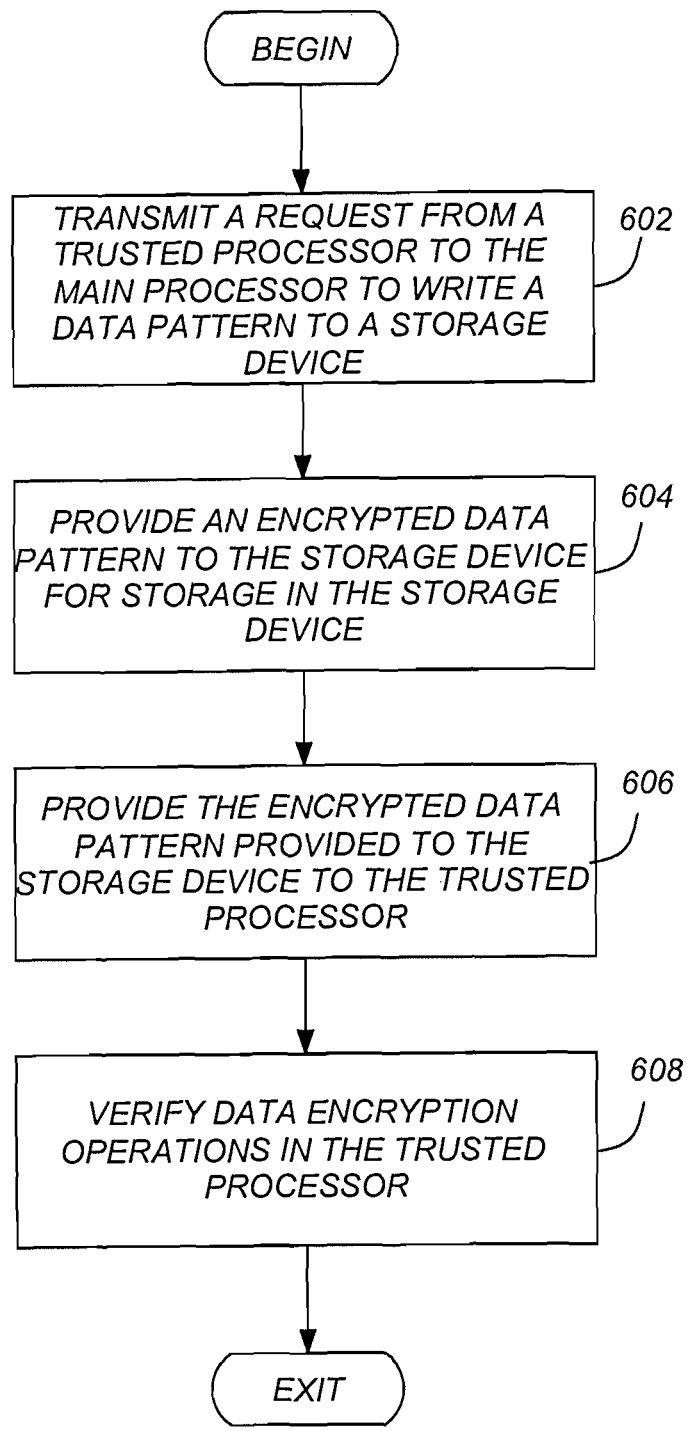
FIG. 6 is a flow chart illustrating steps that can be performed to verify that the data provided between the main processor for storage in the storage device has not been compromised.

FIG. 6 is a flow chart illustrating steps that can be performed to verify that the data provided between the main processor 104 for storage in the storage device 120 has not been compromised. FIG. 6 will be discussed in conjunction with FIGS. 7A-7F, which illustrate the operations described in FIG. 6 as they may be performed by the high-assurance boot content protection system 300 shown in FIG. 3.

Figure 7A:
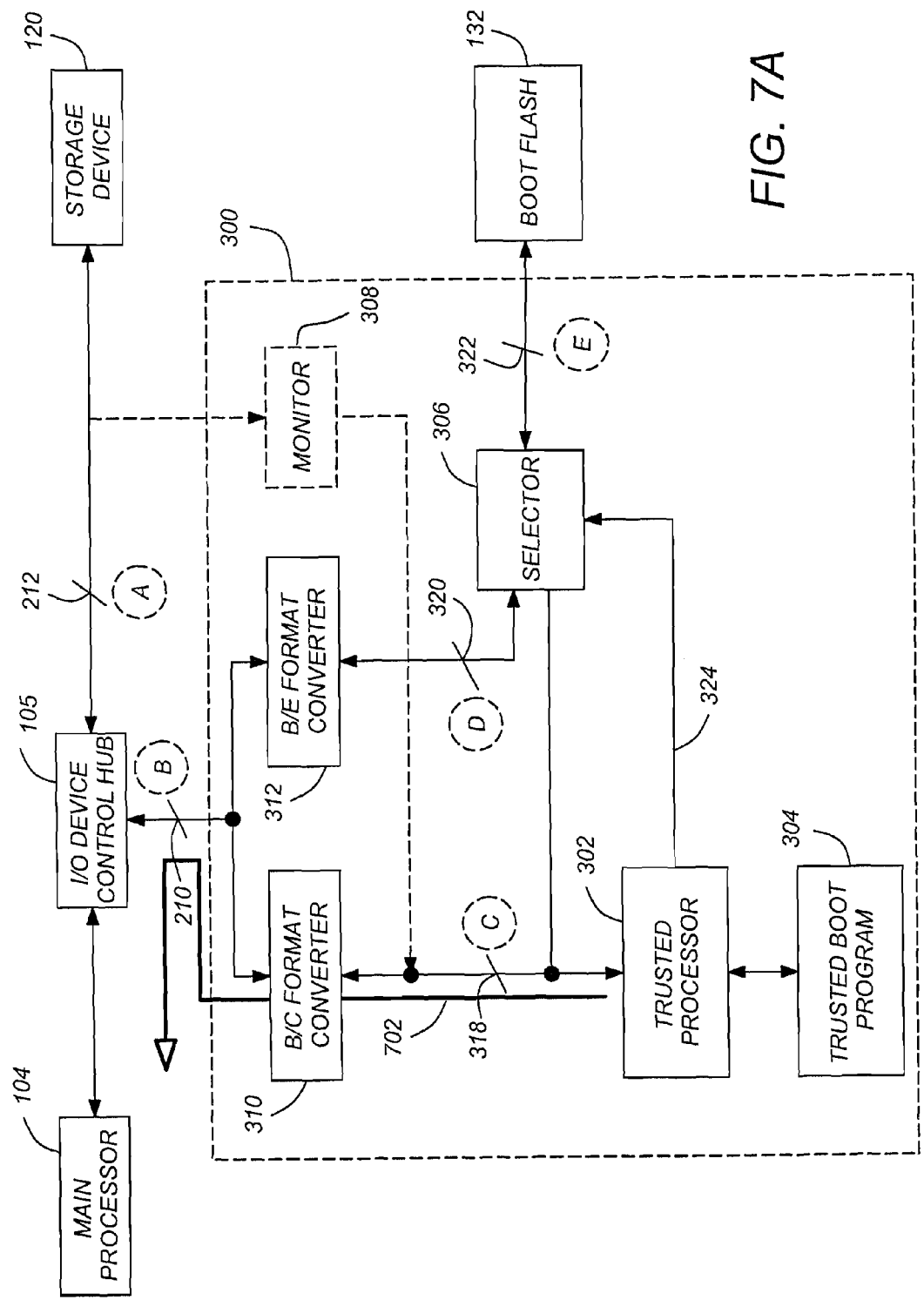
FIGS. 7A-7F are diagrams illustrating the operations of FIG. 6 as applied to the system shown in FIG. 3.
Figure 7B:
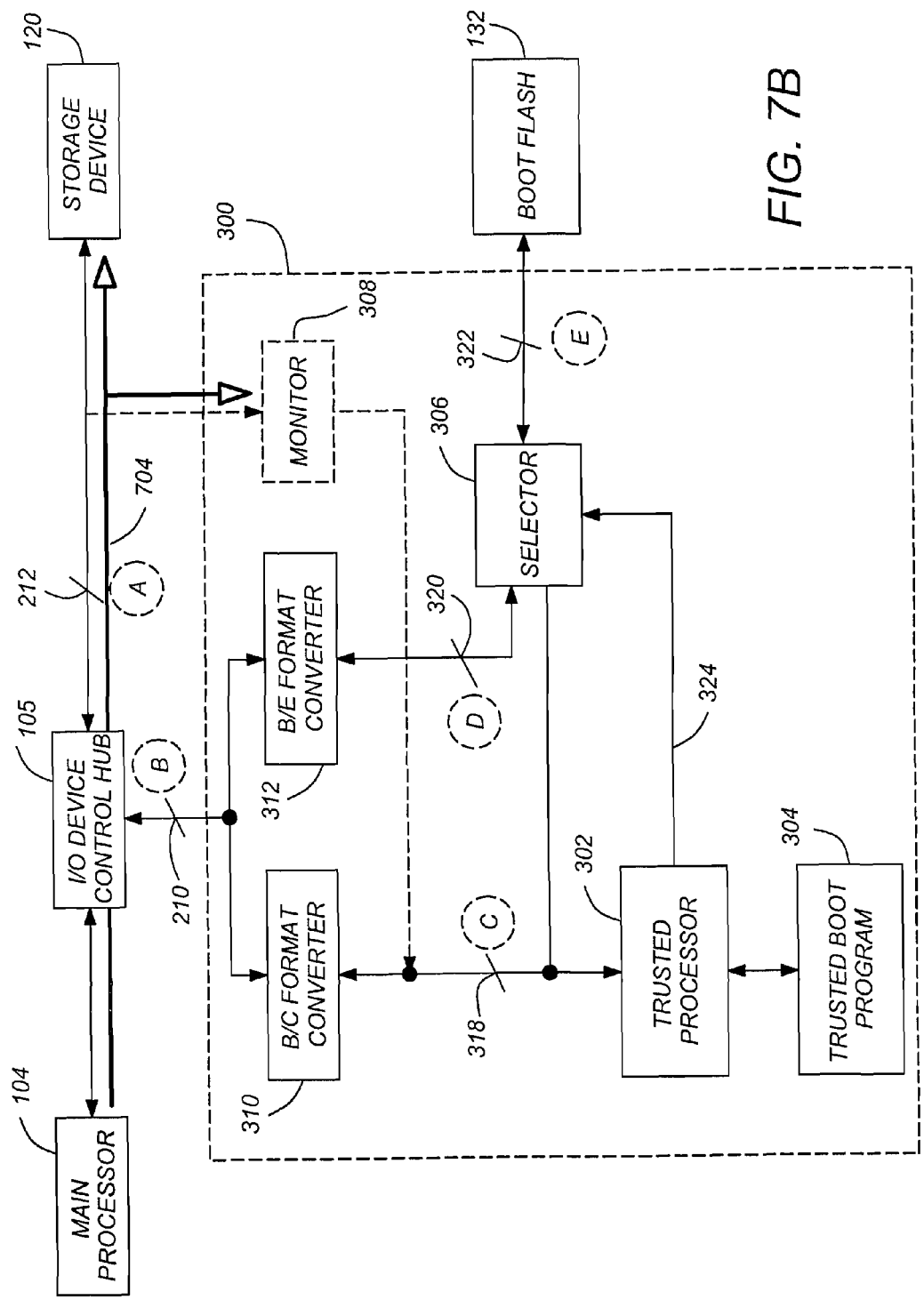

A request is transmitted from the trusted processor 302 to the main processor 104 to write a data pattern to the storage device. This is shown in block 602 and in data path 702 of FIG. 7A. In block 604, an encrypted version of the data pattern is provided to the storage device 120 for storage in the storage device 120. This is shown in FIG. 7B as path 704. As was illustrated in FIG. 2, this encryption may take place in a software encryption/decryption module implemented by the main processor 104, an external hardware encryption/decryption module associated with the main processor 104, or in the I/O controller hub 105.

In block 606, the encrypted data pattern that was provided to the storage device 120 is provided to the trusted processor 302. The information may be provided to the trusted processor 302 for evaluation on a variety of data paths, depending on the location of the monitor 308.

Figure 7C:
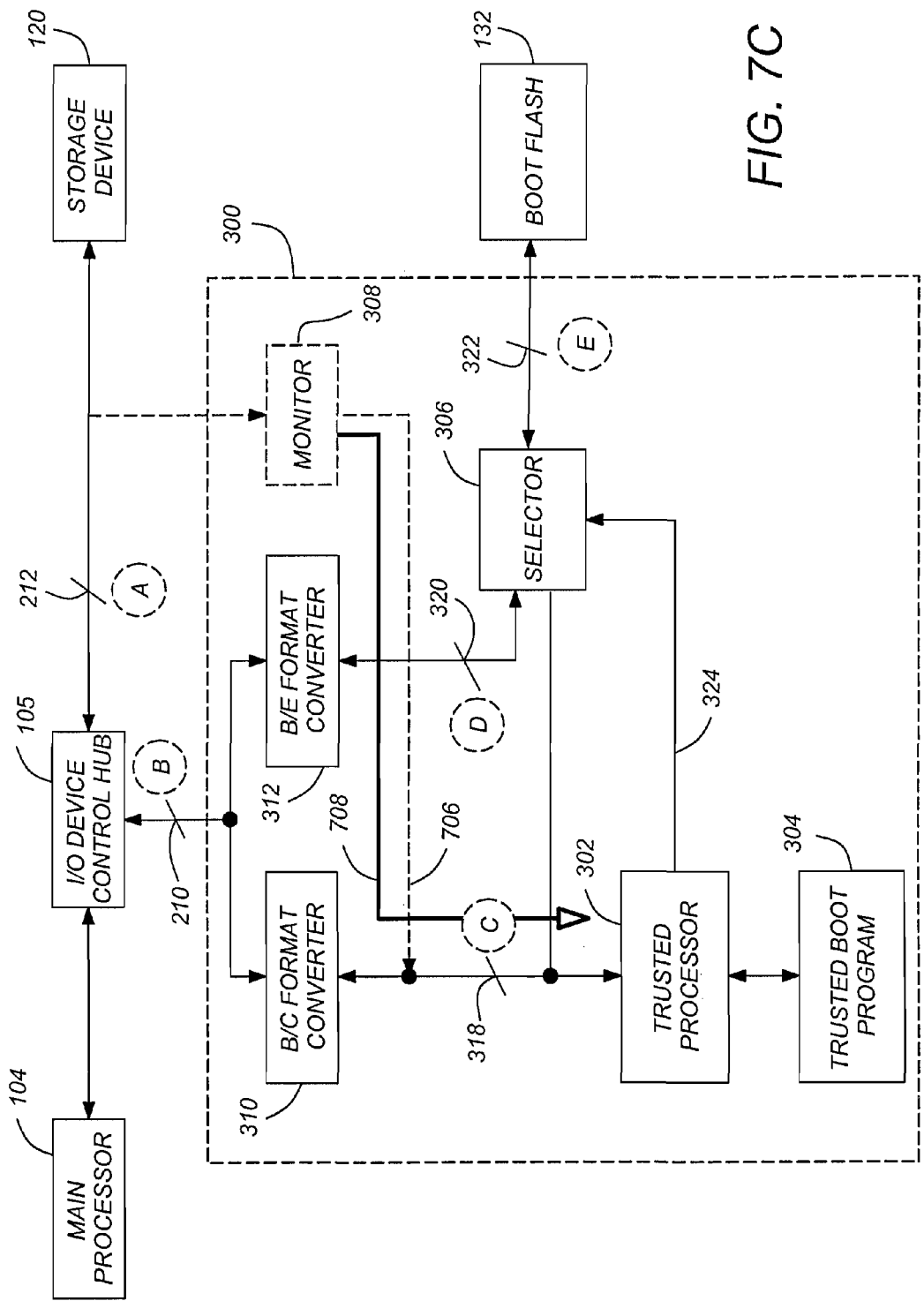

The data may be provided by a direct connection 706 between the monitor 308 and the trusted processor 302 via the trusted processor bus 318, as shown by path 708 in FIG. 7C.

Figure 7D:
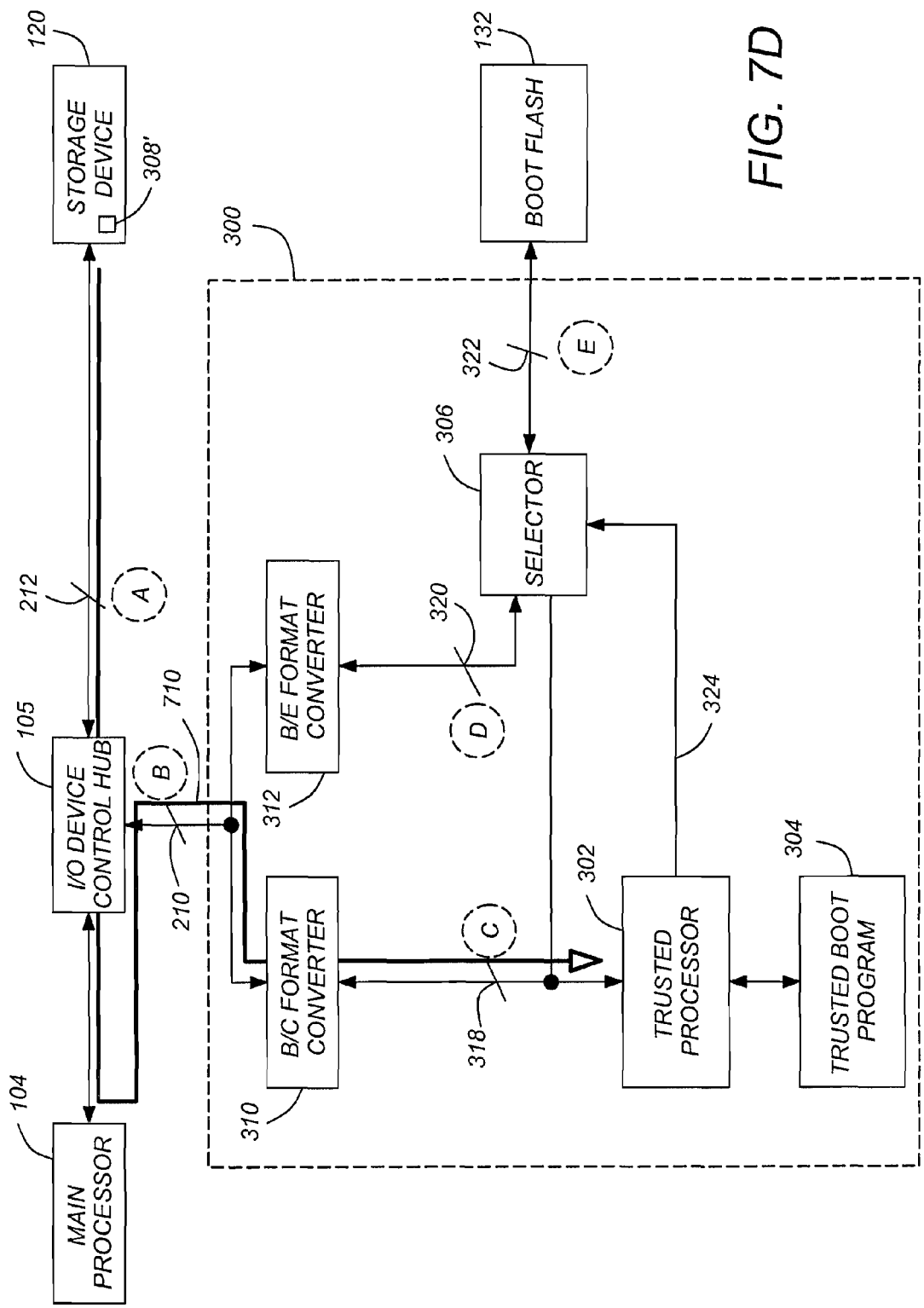

If the monitor 308' is implemented by a memory, register or hidden sector in the storage device 120, the data path may be as illustrated in path 710 of FIG. 7D. In this case, the I/O device control hub 105 reads the register or hidden sector and provides the information to the main processor 104. The main processor 104 then provides the information to the trusted processor 302 via the boot flash bus 210, first format converter 310 and trusted processor bus 318. Alternatively, the data can be provided from the storage device 120 to the I/O device control hub 105 and ultimately to the trusted processor 302 without operation of the main processor 104.

Figure 7E:
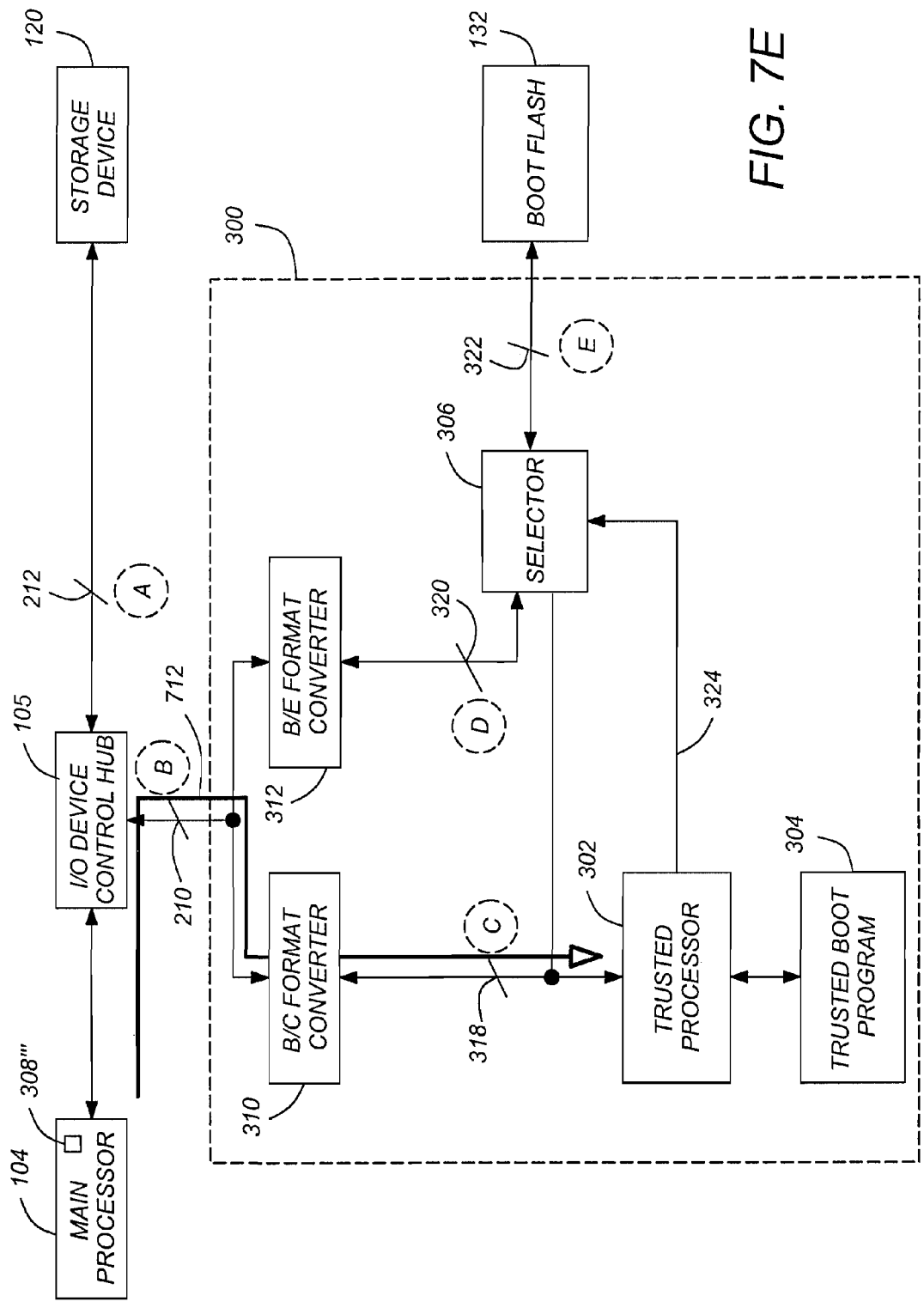

If the monitor 308" is implemented by a memory or register in the I/O device control hub 105, the information may be provided directly to the trusted processor via the main processor 104, the boot flash bus 210 and the trusted processor bus 318, as shown in data path 712 of FIG. 7E. Alternatively, the data can be provided from the I/O device control hub 105 directly, and not via the main processor 104.

Figure 7F:
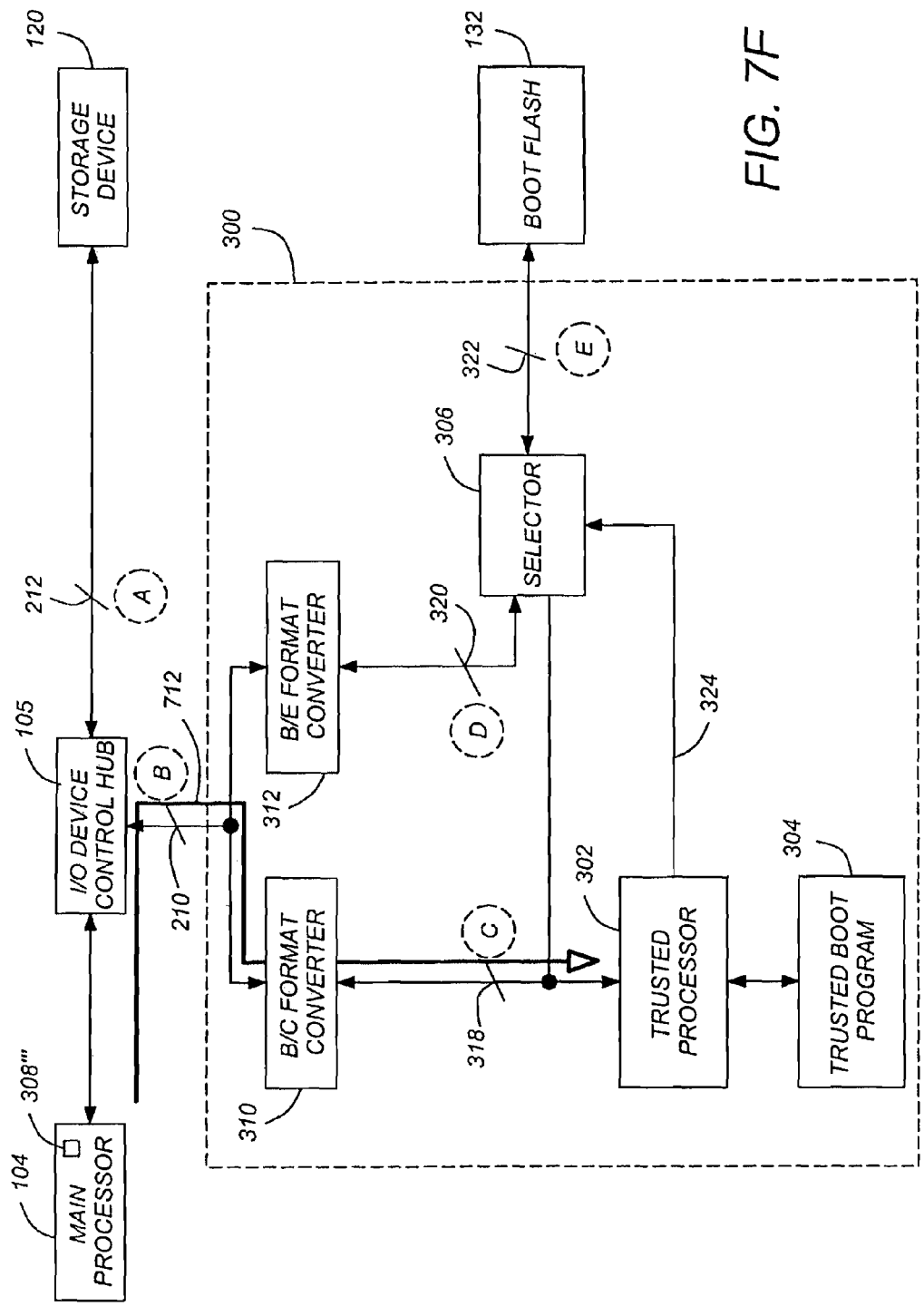

Finally, if the monitor 308''' is implemented by a memory or register in the main processor 104, the data path can be as shown by data path 714 of FIG. 7F.

Returning to FIG. 6, the trusted processor 302 verifies the data encryption operation by comparing the requested data pattern transmitted in step 602 with the data pattern from the monitor 308. In one embodiment, the data pattern read from the monitor 308 is provided to the trusted processor 302 in encrypted form and the trusted processor compares this encrypted data with computed or stored acceptable responses results to verify that the data stored in the storage device has not been tampered with. Alternatively, the data read from the monitor 308 is decrypted before providing it to the trusted processor 302 for evaluation. For example, in embodiments where the data is encrypted in a main processor software module, the encrypted data retrieved from the monitor 308 may be decrypted in the main processor before being provided to the trusted processor 302 for verification. Decryption of the encrypted data retrieved from the storage monitor 308 can also be performed elsewhere, if desired.

Finally, if the comparison fails (the trusted processor 302 determines that the comparison between the data pattern that it requested be written to the storage device 120 does not allow the data encryption and storage operations to be verified), the trusted processor 302 can halt the main processor 104, provide an alarm to the user, or take other appropriate action.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of verifying the encryption of data provided between a main processor and a storage device, comprising the steps of:
    transmitting a request from a trusted processor to a separate main processor to write a data pattern to a storage device;
    generating apart from the trusted processor an encrypted version of the data pattern;
    providing the encrypted data pattern to the storage device for storage in the storage device;
    providing the encrypted data pattern provided to the storage device to the trusted processor; and
    verifying the data encryption operations in the trusted processor from a comparison between the data pattern and the encrypted data pattern provided to the trusted processor;
    wherein the storage device is coupled to the main processor via a storage device bus;
    the step of providing the encrypted data pattern to the trusted processor comprises the steps of:
        monitoring data provided to the storage device, and providing the monitored data to the trusted processor;
    the step of monitoring data provided to the storage device comprises the step of storing data provided to the storage device in a monitor register; and
    the step of providing the monitored data to the trusted processor comprises the step of converting the monitored data from a storage device bus format to a format readable by the trusted processor.

2. The method of claim 1, wherein the monitor register is a solid state memory in the storage device.

3. The method of claim 2, wherein the monitored data is stored in the storage device media.

4. The method of claim 1, wherein the encrypted data pattern is generated by the main processor.

5. The method of claim 1, wherein the encrypted data pattern is generated by a hardware data encryptor disposed between the main processor and the storage device.

6. The method of claim 1, further comprising the step of:
    converting the request from the trusted processor to the main processor to write a data pattern to the storage device to a main processor readable format.

7. An apparatus for verifying encryption of data provided between a main processor and a storage device, comprising:
    a data monitor, communicatively coupled to monitor data written to a storage device; and
    a trusted processor, communicatively coupled to a separate main processor and the data monitor, the trusted processor for generating a command for the main processor to write a data pattern to the storage device, and for verifying the encryption of data provided between the main processor and the storage device using a comparison between the data pattern and an encrypted version of the data pattern encrypted separately from the trusted processor, read from the monitor;
    wherein the storage device is coupled to the main processor via a storage device bus;
    wherein the data monitor is operative to provide the encrypted data pattern to the trusted processor by monitoring data provided to the storage device and providing the monitored data to the trusted processor;
    wherein monitoring the data provided to the storage device comprises storing data provided to the storage device in a monitor register; and
    wherein providing the monitored data to the trusted processor comprises converting the monitored data from a storage device bus format to a format readable by the trusted processor.

8. The apparatus of claim 7, wherein the monitor register is a memory register in the storage device.

9. The apparatus of claim 7, wherein the data monitor obtains data being written to a media of the storage device.

10. The apparatus of claim 7, wherein the main processor generates the encrypted version of the data pattern.

11. The apparatus of claim 7 further comprising a hardware encryptor that generates the encrypted version of the data pattern.

* * * * *